(12) United States Patent
Van Marcke

(10) Patent No.: US 6,215,116 B1
(45) Date of Patent: Apr. 10, 2001

(54) CONTINUOUS THRESHOLD ADJUSTABLE PROXIMITY DETECTING DEVICE

(75) Inventor: Karel Carl Van Marcke, Kruishoutem (BE)

(73) Assignee: Inter Company Computer Engineering Design Services in het kort Concept Design Naamloze Vennootschap (BE)

( * ) Notice: Subject to any disclaimer, the term of this patent is extended or adjusted under 35 U.S.C. 154(b) by 0 days.

(21) Appl. No.: 09/207,824

(22) Filed: Dec. 9, 1998

(30) Foreign Application Priority Data

Dec. 17, 1997 (EP) .................................................. 97 203984

(51) Int. Cl.[7] ..................................................... H01J 40/14
(52) U.S. Cl. ............... 250/221; 250/214 A; 250/214 AG
(58) Field of Search .............................. 250/221, 222.1, 250/214 A, 214 LA, 214 AG, 214 B, 214 R; 330/110; 327/514

(56) References Cited

U.S. PATENT DOCUMENTS

| | | | |
|---|---|---|---|
| 4,314,207 | 2/1982 | Pinternagel | 330/110 |
| 4,682,628 | 7/1987 | Hill | 137/624.11 |
| 5,142,134 | * 8/1992 | Kunkel | 250/221 |
| 5,225,669 | 7/1993 | Hasch et al. | 250/214 |

FOREIGN PATENT DOCUMENTS 43 12 186   10/1994 (DE) .
0463440    1/1992 (EP) .
0813075    12/1997 (EP) .

OTHER PUBLICATIONS

European Search Report dated Mar. 1, 1999 pertaining to application No. 97–203984.6 (4 pages).

European Search Report dated May 26, 1998 pertaining to application No. 97–203984.6 (3 pages).

* cited by examiner

*Primary Examiner*—John R. Lee
*Assistant Examiner*—Kevin Pyo
(74) *Attorney, Agent, or Firm*—Cahill Sutton & Thomas P.L.C.

(57) ABSTRACT

A proximity detecting device for detecting the presence of an object in a target area. It comprises an emitter (1), a circuitry for supplying electrical pulses thereto, a receiver (3) arranged for receiving the emitted pulses and converting them into electrical signals, an amplifier for amplifying said electrical signals, and a control circuitry for determining on the basis of the amplified electrical signals whether or not the object is present in said target area. According to the invention it further comprises means for determining the amplitude of the amplified electrical signals and means for increasing the energy level of said electrical pulses when the amplitude of the amplified electrical signals is below a first threshold value and for decreasing the energy level of said electrical pulses when the amplitude of the amplified electrical signals is above a second threshold value, which is greater than or equal to said first threshold value.

13 Claims, 5 Drawing Sheets

CONTINUOUS THRESHOLD ADJUSTABLE PROXIMITY DETECTING DEVICE

The present invention relates to a proximity detecting device for detecting the presence of an object in a target area and comprising an emitter, a circuitry for supplying electrical pulses of a predetermined energy level to said emitter so as to emit detection pulses towards said target area, a receiver arranged for receiving the detection pulses and converting them into electrical signals, an amplifier for amplifying said electrical signals, and a control circuitry for determining on the basis of the amplified electrical signals whether the object is present in said target area or not.

Such a device is used in particular for detecting the presence of a human or a human body part and may be used to activate all kinds of different systems such as for example alarm systems, automatic door opening systems, counting devices, automatic bathroom fittings such as hand dryers, faucet devices, urinals, toilets, showers, soap dispensers, towel dispensers, wash fountains, etc. U.S. Pat. No. 4,682,628 discloses for example a faucet device which is provided with an automatic active infrared detection system. Instead of infrared detection pulses, it is also possible to use other light pulses or for example ultrasonic pulses.

A drawback of the existing active infrared detection systems is that they are unable to detect small variations in the amplitude of the received detection pulses, and are thus unable to apply a movement criterion for detecting the presence or the continuing presence of the object. In practice they are only designed for detecting the simple presence of the object. This means that, for example in the case of a faucet device, the sensor, i.e. the emitter and the receiver, may not be directed into the sink or wash basin if one wants to avoid delicate and time consuming adjustments when installing them. Moreover, even when the sensor has been accurately adjusted, a stationary object such as for example a stack of dishes may cause false actuations, i.e. may keep the faucet open resulting in an important waste of water. When one would consider applying a movement criterion to the existing infrared detection systems to avoid such situations, this would not result in a practical solution to the above described problem due to the fact that variations in amplitude of the received detection pulses would only be detectable within a very restricted detection field. Indeed, the power received by the receiver is inversely proportional with the squared distance between the emitter and the receiver, when they are disposed opposite to one another, and even with the fourth power of the distance between the object and the emitter/receiver when the emitter and receiver are disposed next to one another and the emitted pulses are reflected by the object to the receiver. Consequently, when the emitted detection pulses are of a sufficient energy level to enable an accurate detection at a certain distance, the same energy level would be much too high to detect variations at a somewhat shorter distance. In other words, at this shorter distance the detection device would be blinded.

An object of the present invention is now to provide a proximity detecting device which enables to detection of changes in amplitude or energy level of the received detection pulses accurately over a sufficiently large distance range.

To this end, the proximity detecting device is characterized according to the invention in that it further comprises means for determining the amplitude of the amplified electrical signals and means for increasing the energy level of said electrical pulses when the amplitude of the amplified electrical signals is below a first threshold value and for decreasing the energy level of said electrical pulses when the amplitude of the amplified electrical signals is above a second threshold value, which is greater than or equal to said first threshold value.

In this way, the energy level of the emitted detection pulses is always automatically adjusted to the distance of the object which is to be detected and to other parameters such as the color, gloss, etc. thereof which also determine the amplitude of the pulses received by the receiver. Consequently, an accurate measurement of the amplitude of the received detection pulses is always possible, at least when the object is within the detection field, and no separation adjustment is required when installing the device, especially not when the target area is delimited in front of the emitter by a surface reflecting the emitted detection pulses towards the receiver. In this latter case, the energy level of the emitted detection pulses is immediately automatically adjusted, in the absence of any other object, on the basis of the pulses reflected by such surface. This surface is usually more reflective than for example the hands of a user so that, in the absence of a user, the energy level of the emitted detection pulses is automatically lowered resulting in a saving of energy.

In an advantageous embodiment of the device according to the invention, the amplifier provides a voltage gain which decreases as the amplitude of the amplified electrical signal increases and vice versa which increases as the amplitude of the amplified electrical signal decreases.

By providing such a non-linear amplification of the received signals, the amplitude thereof, or more particularly changes in the amplitude thereof, are correctly detectable over larger distance variations for a particular energy level of the emitted detection pulses. Consequently, less adjustments are to be applied to this energy level or, in other words, the energy level of the emitted detection pulses can be adjusted with larger steps.

Further particularities and advantages of the invention will become apparent from the following description of some particular embodiments of the proximity detecting device according to the present invention. This description is however only given by way of example and is not intended to limit the scope of the invention. The reference numerals used in this description relate to the annexed drawings wherein.

Figure 1:
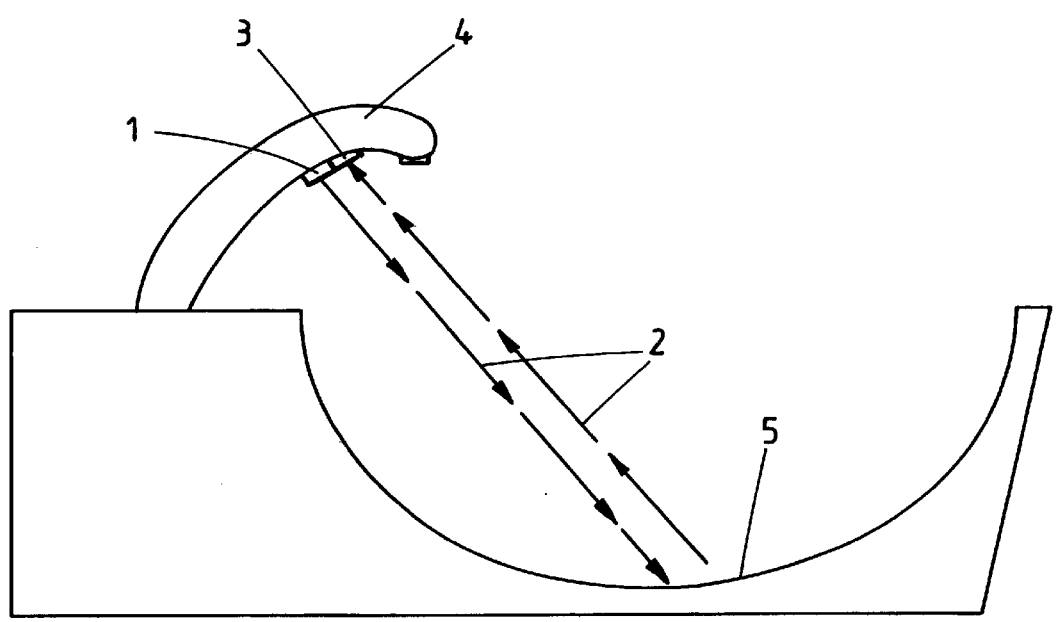
FIG. 1 shows a possible application of a proximity detecting device according to the invention for a faucet device.

The proximity detecting device according to the present invention can be used, as set forth already hereinabove, in many applications. FIG. 1 shows for example the application in a faucet device. For simplicity's sake, the further description of the invention will be given hereinafter with reference to the actuation of a flow control valve for such a faucet device but it will be clear that it can easily be applied to many other applications, in particular for controlling the operation of flushing devices, such as a urinal.

The proximity detecting device according to the invention is based on an active detection system. This means that it comprises an emitter 1 for emitting detection pulses 2 to the target area and a receiver 3 for receiving the detection pulses. In the example of FIG. 1, both the emitter 1 and the receiver 3 are disposed next to one another on the faucet 4 and the receiver 3 is arranged to receive the detection pulses after being reflected by the object to be detected or, in the absence of such an object, by the surface 5 of the washbasin. Alternatively, the emitter 1 and receiver 3 can also be directed more upwards so that the receiver 3 does not receive any pulses reflected by the washbasin. However, preference is given according to the present invention to directing the emitter 1 and receiver 3 towards the surface 5 of the washbasin.

The emitter 1 of the device according to the present invention may emit different types of pulses, such as light or ultrasound pulses, preference being given however to light pulses, in particular to infrared light pulses although visible or ultraviolet light can also be used. In the preferred embodiment shown in the figures, the emitter 1 consist of an IR light emitting diode (LED).

In order to emit the detection pulses, electrical pulses of a predetermined energy level are applied by a circuitry 6 to the LED 1. This circuitry is shown schematically in FIGS. 2 and 3 and comprises switching means 7 and an electric power source 8, usually a low voltage power source, for generating the required electrical pulses. According to prior art active detection systems, the LED can be connected directly by the switching means 7 to the power source. However, in order to save energy to increase the life of the battery, use is preferably made in the device of the present invention of a circuitry as described in the co-pending European patent application No. 0 813 075 of the same applicant. The entire content of this European patent application is included herein by way of reference.

The working principle of this circuitry will now be described with reference to FIGS. 2 to 4. The preferred circuitry for generating the electrical pulses shown in these figures comprises a first circuitry 9 and a second circuitry 10. The first circuitry 9 comprises a primary coil 11 and the switching means 7, which are arranged for connecting the primary coil 11 for a period of time to the power source, in particular to the battery 8 such as to accumulate a predetermined amount of magnetic energy in the primary coil 11. The second circuitry 10 comprises the light emitting diode (LED) 1 and a secondary coil 12 which is magnetically coupled to the primary coil 11. This can be done by disposing both coils around a same core, for example around the two legs of a closed U-shaped core. Preference is however given to disposing both coils over one another around the same core 13. In this way, energy losses can be restricted to a minimum.

Figure 2:
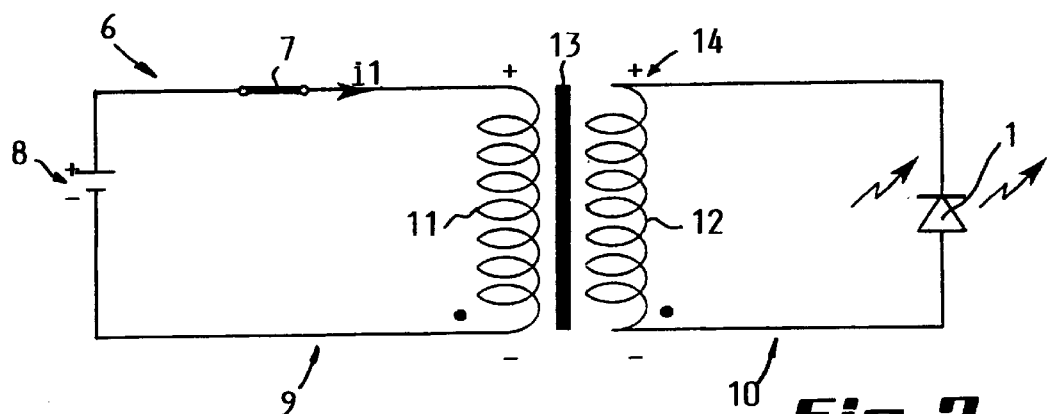
FIGS. 2 and 3 illustrate schematically the main components of the emitter circuitry of a particular embodiment of the device according to the invention.
Figure 3:
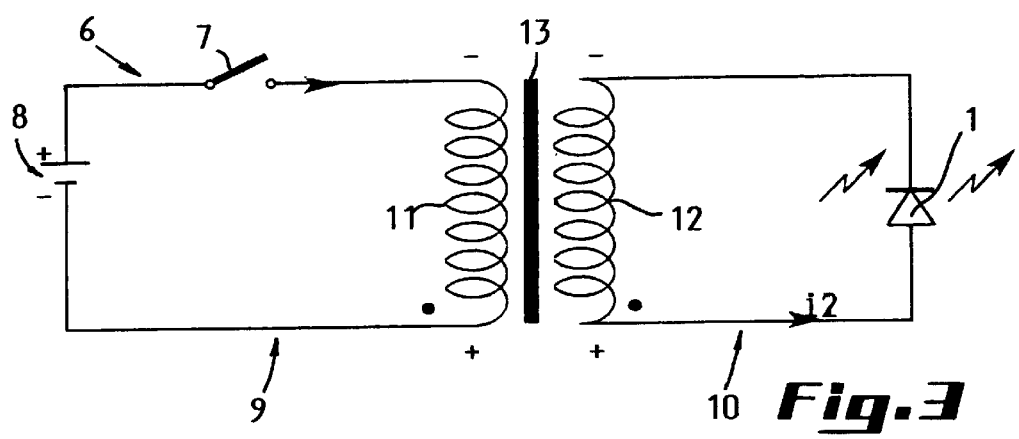

In the embodiment shown in FIGS. 2 and 3, the primary and secondary coils 11 and 12 have the same winding direction, but it is clear that they may have alternatively opposite winding directions. When accumulating magnetic energy in the coils by closing the switching means 7 so that a current i1 flows through the primary coil 11 as shown in FIG. 2, a voltage will be generated in the secondary coil 12, having the polarity indicated by 14, but due to the direction of the LED 1, no current can flow in the second circuitry. When opening the switching means 7 as shown in FIG. 3, the current i1 through the primary coil 11 and thus also the magnetic field generated thereby drops suddenly to 0, as a result of which an electromotive force is generated by mutual induction in the secondary coil 12. This electromotive force has the opposite polarity of the electromotive force generated when the magnetic energy was accumulated in the coils so that a current i2 can now flow through the LED 1.

Upon opening the switching means 7, the magnetic energy is very quickly transformed by mutual induction into an electrical pulse in the second circuitry 10. The number of windings n1 in the primary coil 11 is higher than the number of windings n2 in the secondary coil 12, allowing to generate electrical pulses of a higher current level than the electrical current supplied by the power source 8 to the primary coil 11. Preferably, the proportion of the number of windings n1 in the primary coil 11 to the number of windings n2 in the secondary coil 12 is at least equal to about 100, and the primary coil has a number of windings of at least about 300. This enables transformation of the accumulated energy into a high peak current for a short period of time. In view of the allowable duty cycle of the LED for such high peak currents, the generated pulses should more particularly have a raising edge of a duration which is preferably shorter than 10 $\mu$sec.

Preferably, the core 13 connecting the primary coil with the secondary coil is a ferrite core, since such a material shows adequate hysteresis properties which enables restricting the energy losses to a minimum and which further enables achievement of the required short pulse duration.

Figure 4:
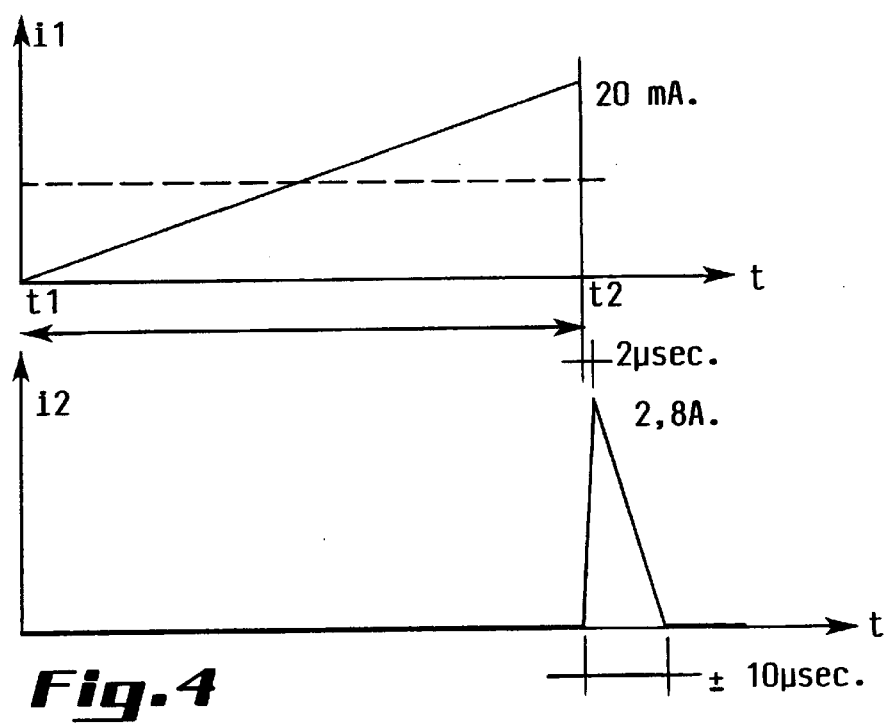
FIG. 4 illustrates the current flowing in the first and second circuitry of the emitter circuitry shown in FIGS. 2 and 3.

FIG. 4 illustrates two graphs of the current flow in the circuits shown in FIGS. 2 and 3, respectively, of a specific example wherein the battery 8 has a voltage of 9V, the number of windings n1 in the primary coil 11 equals 707, and the number of windings n2 in the secondary coil 12 equal 5, the core being a ferrite core. When closing the switching means 7 at the moment t1, a current i1 flows in the first circuitry 9 which increases linearly in time due to the presence of the primary coil 11. Upon opening the switching means 7 at the moment t2, a peak current i2, having a short duration, more particularly a raising edge of only about 2 $\mu$sec, flows in the second circuitry 2 and thus through the LED 1.

In this example, the current in the first circuitry was 0 mA at t1 and 20 mA at t2, while t2−t1 was equal to 366 $\mu$sec. From the Lenz law, it can now be deduced that in case the energy losses are negligible, the self induction L1 in the primary coil 11 is equal to:

$$\frac{9\text{V} * 366 * 10^{-6}\text{s}}{20 * 10^{-3}\text{A}} \cong 0.165 \text{ Henry}$$

Since both coils are wound on the same core, the induction in one winding of the primary coil 101 is equal to the induction in one winding of the secondary coil. It can therefore be deduced that:

$$\frac{L1}{L2} = \frac{n1^2}{n2^2} = k^2$$

wherein L2 is the mutual induction in the secondary coil 12, n1 is the number of windings in the primary coil, n2 is the number of windings in the secondary coil and k is the proportion of the number of windings in the primary coil to the number of windings in the secondary coil.

In case the energy losses upon transforming the magnetic energy into electrical energy are negligible, the amount of energy E in the first circuitry is equal to the amount of energy E in the second circuitry. Starting from the formulae of the amounts of energy in both circuits, the following deduction can be made:

$$E = \frac{i1_{max}^2 * L1}{2} = \frac{i2_{max}^2 * L2}{2}$$

$$i2_{max}^2 = \frac{i1_{max}^2 * L1}{L2} = \frac{i1_{max}^2 * L1}{\frac{L1}{k^2}} = i1_{max}^2 * k^2$$

$$i2_{max} = i1_{max} * k$$

wherein $i1_{max}$ is the maximum current in the first circuitry and $i2_{max}$ is the maximum current in the second circuitry. In this example is k equal to about 141 and $i1_{max}$ to about 20 mA so that $i2_{max}$ will be approximately equal to about 2.8 A.

On the basis of the data shown in FIG. 4, the energy consumption required for emitting the light pulses can easily be calculated. Indeed, in the present example the battery is connected to the primary coil for 366 μsec, providing a current i1 having an average value of 10 mA. If the device is provided for generating one electrical pulse per second the duty cycle δ of the device will be:

$$\delta = \frac{366 * 10^{-6} \text{sec}}{1 \text{sec}} = 0.000366$$

This means that the average current consumption of the battery is 3.66 μA and that the energy consumption for generating one electrical pulse per second is 10 mA*0.000366*9V*3600 s/h=118.6 mJ/h. In practice, the battery provides also current to the periphery, which is not taken into consideration herein.

Figure 5A:
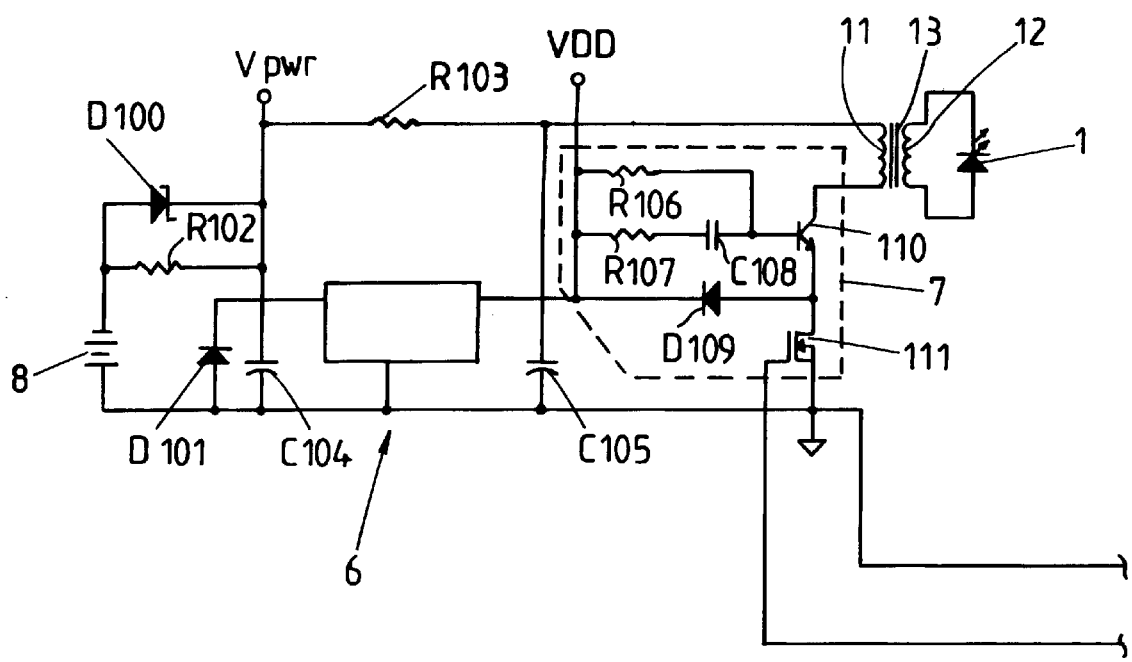
FIGS. 5a and 5b illustrate schematically an electronic circuitry of a device according to the invention.

FIG. 5, in particular FIG. 5a, illustrates schematically an electronic circuitry for generating the electrical pulses and supplying them to the LED 1. The following table gives the identification or component values of components indicated in FIG. 5a by a reference numeral.

| Ref. No. | Value or identification of Components | Ref. No. | Value or identification of Components |
|---|---|---|---|
| 1 | infra red emitter (LED) | 106 | 12 kΩ |
| 100 | Schottky diode | 107 | 1 kΩ |
| 101 | diode (1N4001) | 108 | 100 nF |
| 102 | 100 Ω | 109 | diode (1N4148) |
| 103 | 1 kΩ | 110 | transistor BUX 87 |
| 104 | 4700 μF | 111 | mosfet BSP295 |
| 105 | 10 μF/16 V | | |

Since a circuit designer of ordinary skill in the art could build and use this circuitry as a result of this information, a detailed description of the signal paths and functions of the various components need not be undertaken. Instead, certain features of these circuits will be highlighted in the discussion below.

Under control of timer means in the microcontroller 15, the switching means 7 are opened and closed for disconnecting and connecting the primary coil 11 for a period of time to the battery 8, as explained hereinabove. As switching means 7, use is made of a cascade circuit 106–111 comprising a transistor Q110, resistors R 106 and R 107, a capacitor C108, a diode D109 and a mosfet 111, as illustrated in FIG. 5a. Such a cascade circuit, which is also known as emitter switching, is known per se and allows to switch the transistor Q110 very quickly on and off, which is required to resist to high voltage peak values. Transistor Q110 can resist to the high voltage peak values, which is caused by the primary coil 11 when opening the switching means, while mosfet 111, due to the other elements of the cascade circuit, must only resists to a voltage of 5V supplied by a voltage regulator 16.

Starting from the battery 8, the circuit comprises resistor R102 and diodes D100 and D101 in such a configuration that, in case the battery is not inserted in the right position, the generated inverse voltage is clamped to −0.7 Volts by diode D101, protecting the entire circuit from inverse polarity.

Capacitors C104 and C105 are connected as buffer capacity for outputting an activation signal, for example for opening and closing a valve in case the device according to the invention is used for an automatic faucet device. The primary and secondary coils 11 and 12 are wound around the same ferrite core 13, as explained hereinabove.

When an electrical pulse is generated, as explained hereinabove, the light emitting diode 1 emits an infra-red light beam in the target area. If an object is present in this target area, the presence of this object will be detected by means of a receiver 3 for the emitted light beam. This can be done in different ways. According to a first embodiment, the emitted signal is reflected by the object back towards the receiver 3. According to a second embodiment, the signal emitted from the LED is transmitted towards a receiver, either directly or through the intermediary of a reflector. The presence of an object is in this case detected when the emitted signal is interrupted by the object and does not reach the receiver any more or with a too low amplitude. Both embodiments can also be combined in the device according to the present invention notwithstanding the usually different reflection properties of the reflector and the object. In the configuration of FIG. 1, the emitted light pulses are, for example, reflected by the surface of the washbasin when a user is not present, whereas, in case a user is present, the light pulses reflected by the hands of the user are detected. As explained hereinafter, this is enabled by the present invention due to the fact that it provides an automatic adjustment of the power level of the emitted detection pulses on the basis of the amplitude of the received pulses.

Figure 5B:
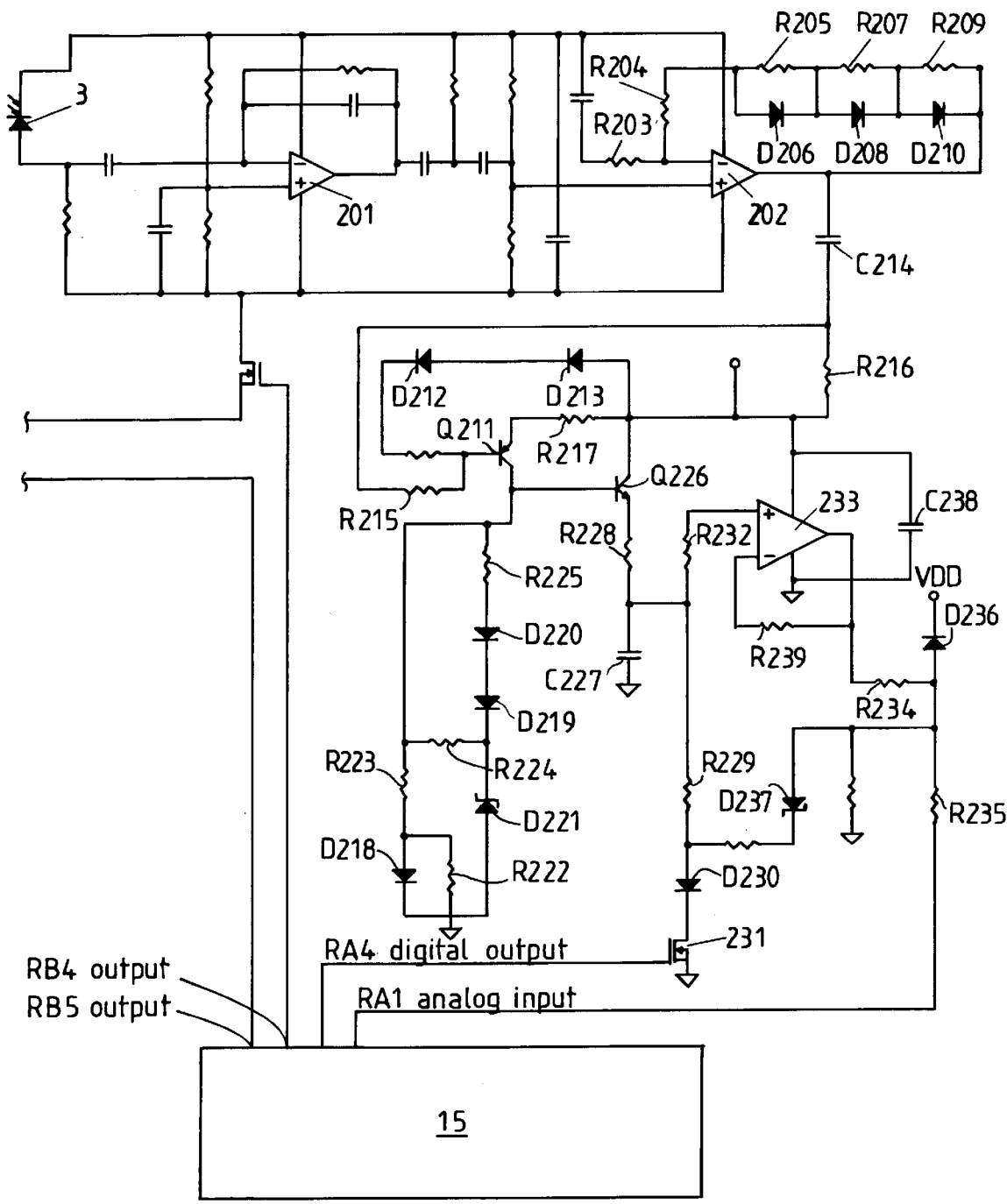

This automatic adjustment is performed by the microcontroller 15 and is based on the amplitude of received detection pulses which are converted by the receiver 3, which is for example a photo diode or a photo transistor, into electrical signals and subsequently amplified by an amplifier. In practice, instead of measuring the amplitude of the received detection pulses, the corresponding amplitude of the amplified electrical signals is determined. According to the invention, means are provided, in particular in the microcontroller 15, for increasing the energy level of the electrical pulses supplied to the emitter 1 when the amplitude of the amplified electrical signals is below a first threshold value and for decreasing the energy level of these electrical pulses when the amplitude of the amplified electrical signals is above a second threshold value, which is greater than or equal to the first threshold value. In this way, it is possible to accurately determine changes in the amplitude of the received signals over a relatively large target area and, based thereon, the presence or absence of a moving object. If both threshold values are the same or nearly the same, this can be done on the basis of the actuations of the means for increasing or decreasing the energy level of the electrical pulses for the emitter 1. Otherwise, the presence or absence of an object can be determined on the basis of variations of the measured amplitudes of the received and amplified signals. Since the amplitude of the received detection pulses varies very strongly as a function of the distance between the object and the emitter 1 and receiver 3, a non-linear amplification of these signals is preferably provided. The amplifier or amplifying circuitry, shown for example in FIG. 5b, provides to this end a voltage gain which decreases as the amplitude of the amplified electrical signal increases and vice versa which increases as the amplitude of the amplified electrical signal decreases. In this way, the amplitude of the amplified electrical signal can be determined accurately over a larger distance range so that less adjustments of the energy level of the emitted pulses are required. For the same purpose, the amplifying circuitry of FIG. 5b, comprises additionally means for reducing the amplitude of at least the amplified electrical signals having the greatest amplitude, the reduction being in particular greater as the amplitude of the amplified electrical signal increases and the reduction being vice versa smaller as the amplitude of the amplified electrical signal decreases. How this non-linear amplitude can be obtained in practice, will become apparent from the following description of the amplifying circuitry shown in FIG. 5b.

The circuitry of FIG. 5b comprises first of all the receiver 3 which is a photo diode or a photo transistor. When the receiver 3 receives an emitted detection pulse, it generates an electrical signal which is amplified first of all by a first operational amplifier (OP-AMP) 201 with a non-inverting voltage feedback and subsequently by a second OP-AMP 202 also with a non-inverting voltage feedback.

This second OP-AMP 202 shows a voltage gain which is non-linear due to the feedback loop comprising the combination of the resistor R203 with resistor R204, resistor R205/diode D206, resistor R207/diode D208 and resistor R209/diode D210. The resistors in this feedback loop have for example the following values: R203=9 kΩ; R204=27 kΩ; R205 =39 kΩ; R207=150 kΩ; and R209=220 kΩ. The OP-AMP 202 provides for an amplification of negative pulses. Consequently, when referring to a larger signal, a more negative pulse is intended.

For very low input voltages, the voltage gain $A_{v0}$ of this OP-AMP with variable voltage feedback comprises $$A_{v0}=1+(R204+R205+R207+R209)/R203$$

Indeed, the diodes are non-conductive and their equivalent resistances are much higher than the used resistances R205, R207, R209.

When the output voltage decreases, due to a decreasing input voltage, diode D210 will first become conductive since R209>R207>R205. The voltage drop over R209 is indeed larger than the one over R207 or R205. When diode D210 becomes conductive, the dynamic resistance of this diode becomes practically zero. The corresponding voltage gain $A_{v1}$ is accordingly $$A_{v1}=1+(R204+R205+R207)/R203$$

When the output voltage decreases further, due to a further decreasing input voltage, then diode D208 will also become conductive. The voltage drop over R207 is indeed larger than the one over R205. In this way, already two resistances are short-circuited by the corresponding conductive diodes D210 and D208. The new voltage gain $A_{v2}$ is consequently $$A_{v2}=1+R204/R203$$

The electrical signal amplified by the OP-AMP 202 is subsequently amplified by a transistor Q211. The input of this amplifier on the base of Q211 is also non-linearized, more particularly by two serial diodes D212 and D213. For this amplifying circuit also, the larger the negative pulse, the more limited is the signal.

In a following phase of the circuitry shown in FIG. 5b, use is made of a threshold amplifier having the property of only amplifying those signals, the momentary value of which is higher than a certain threshold value. The threshold amplifier of FIG. 5b is a very special amplifier. It has an output swing from 0 till higher than 5V, the voltage gain of which is reduced as much as possible for larger input signals, and the power consumption of which is equal to zero in the absence of a significant input signal.

The negative pulses from the OP-AMP 202 are coupled by capacitor 214 and resistor R215 to the base of transistor Q211. Resistor R216 provides a DC-voltage equal to the one of the emitter of Q211, which is a transistor of the PNP type. This transistor can only become conductive when the pulses have a negative amplitude exceeding the threshold value of about −0.6V, i.e. the threshold value of the base-emitter junction. In this phase, the noise signals of the receiver and the first amplifier are eliminated.

The collector voltage of Q211 can be calculated according to the following equation:

$$V_{CQ211}=E_c \cdot R_L$$

wherein:

$V_{CQ211}$=the total momentary collector voltage with respect to the mass;

$i_c$=the total momentary collector current;

$R_L$=the actual momentary load resistance.

The voltage amplification $A_v$ comprises on the other hand approximately $$A_v=i_c \cdot R_L/(i_B+h_{iE}+(1+h_{fe}) \cdot i_B \cdot R217)$$

$$A_v=i_c \cdot R_L/i_B \cdot (h_{iE}+(1+h_{fe}) \cdot R217)$$

$$A_v=h_{fe} \cdot R_L/(h_{iE}+(1+h_{fe}) \cdot R217)$$

wherein $V_{CQ211}$=the momentary collector voltage with respect to the mass;

$i_B$=the total momentary base current $h_{iE}$=the differential base/emitter resistance $h_{fe}$=the small signal current amplification factor for common emitter switching.

The following reasoning presupposes that conductive diodes behave like short-circuits with respect to the resistors in their circuitry and is based on different resistances of the used resistors. These resistances may for example be as follows: R222=15 kΩ; R223=15 kΩ; R224=3.3 kΩ; and R225=1.2 kΩ.

1. For negative input pulses of an amplitude smaller than 0.6 V, transistor Q211 will not conduct and the collector voltage will consequently remain zero. Therefore $A_{v1}$=0.

2. For negative input pulses of a small amplitude, but higher than the 0.6 V threshold, not any of the diodes D218, D219, D220 and D221 will be conductive and $$R_L=R223+R222$$

Consequently, $R_L$ has a large value but as a result of the small $i_c$ value, also the value of $h_{fe}$ will be small, so that the first of the above three equations will result only in a small $A_{v2}$ value.

3. For negative input pulses of a larger amplitude than the one of the previous case, only diode D218 conducts and short-circuits resistor R222. $R_L$=R223 has already a smaller value than in the previous case but $h_{fe}$ will have already a higher value so that $A_{v3}$ increases.

4. For negative input pulses of a still higher amplitude than the one of the previous case, the Zener diode D222 becomes conductive and switches resistor R224 in parallel with resistor R223. In this way, RL=R223·R224/(R223+R224) becomes smaller than in the previous case and $A_{v4}$ taking the $h_{fe}$ value into account, remains constant.

5. For negative input pulses of a still larger amplitude than the one of the previous case, all diodes in the collector circuitry become conductive so that $R_L$ becomes equal to the parallel switching of resistor R223 with resistor R224 and R225 and is therefore relatively small.

6. Without this specific load, the voltage amplification $A_v$ would increase as the input voltage increases since the $h_{fe}$ value increases for higher collector currents.

In a further phase of the circuitry shown in FIG. 5b, a voltage peak detector with sample and hold properties is applied. The received light signal is in fact a pulse. After amplification, this electrical voltage pulse, which is positive after the amplification step of transistor Q211, has to be evaluated analogously on its maximum amplitude. This is done by the analog/digital converter of the microcontroller. In order to enable this, taking into account the requirements of the microcontroller as to i.a. the input impedance, timings, etc., the signal is additionally processed. This additional processing consists of detecting the peak value of the voltage pulse and to store it in an analog memory during the time necessary for making the A/D converter of the microcontroller operational.

In the circuitry illustrated in FIG. 5b, this is achieved by the circuit around transistor Q226. This transistor is arranged as an emitter follower and can charge capacitor C227 very quickly, but tempered by resistor R228, when a positive pulse is applied to its base. Capacitor C227 is however only discharged through resistor R229, diode D230 and mosfet 231 when ordered by the programming through the outlet gate RA4 of the microcontroller. In short, C227 is charged very quickly with the amplitude of the positive pulse reduced with the base-emitter voltage of 0226. When the base voltage of Q226 drops however to 0, Q226 is blocked. Q226 functions consequently as a rectifier having however a high input impedance and a low output impedance when charging capacitor C227. This is thus clearly a voltage peak detector with sample and hold properties.

In a further phase of the circuitry according to FIG. 5b, a unity amplifier is connected between the peak detector/sample and hold amplifier C227 and the analogous input gate RA1 of the microcontroller. This is done through the intermediary of safety resistors. Resistor R232 to protect the inlet of the OP-AMP 233 and resistors R234 and R235 for protecting the input gate RA1 of the microcontroller.

Diode D236 serves as protection of the input gate RA1 of the microcontroller when the output voltage of the OP-AMP 233 would be higher than 5V. Very particular is the function of diode D237 which ensures that when switching of the OP-AMP 233, the output of OP-AMP 233 and therefore the input gate RA1 of the microcontroller would not be on an unknown floating potential. When discharging capacitor C227 through resistor R229 and the output gate RA4 of the microcontroller, diode D237 is made conductive and draws the voltage to the output of OP-AMP 233 and therefore the input gate RA1 of the microcontroller to the mass. Capacitor C228 is a normal uncoupling capacitor and resistor R239 a feedback resistor.

Based on the signal received by the microcontroller through its RA1 gate, it can determine whether or not an object is present in the target area. As explained hereinabove, the microcontroller comprises moreover means for determining the amplitude of the signals received thereby and for increasing or decreasing the energy level of the electrical pulses supplied to the emitter 1. To this end, the analog input signals (of between 0–5 V) of the microcontroller are first of all converted to a digital value comprised for example between 0 and 256. In the memory of the microcontroller, tables may be stored containing the relation between the distance of the object from the emitter/receiver and the corresponding digital values of the amplified signals. The memory of the microcontroller may contain for example three of such tables, corresponding to three different energy levels of the emitted detection pulses. When the digital value of the amplified signal is below a first threshold value, the energy level of the emitted detection pulses is increased and the corresponding table in the memory of the microcontroller is used and vice versa when the digital value of the amplified signal is above a second threshold value, higher than or equal to the first value. As it will be apparent from the above description of the circuit for supplying the electrical pulses to the emitter, it is clear that the energy level of these electrical pulses can easily be adjusted by adjusting the time during which the switching means 7 are closed. Indeed, as it appears from FIG. 4, there is a linear relation between the time the switching means 7 are closed and the energy accumulated in the coils 11 and 12. This time is controlled by the microcontroller by its output signal to mosfet 111 through the output gate RB5.

The detection of the object in the target area can now be based on different principles. When the first and second threshold values are the same or relatively close to one another, the detection can first of all be based on the actuations of the means for increasing or decreasing the energy level of the emitted detection pulses. Indeed, in principle, the amplitude of the amplified signals should in such case be nearly the same. A change in the energy level of the emitted pulses would mean that a moving object is present in the target area.

Figure 6:
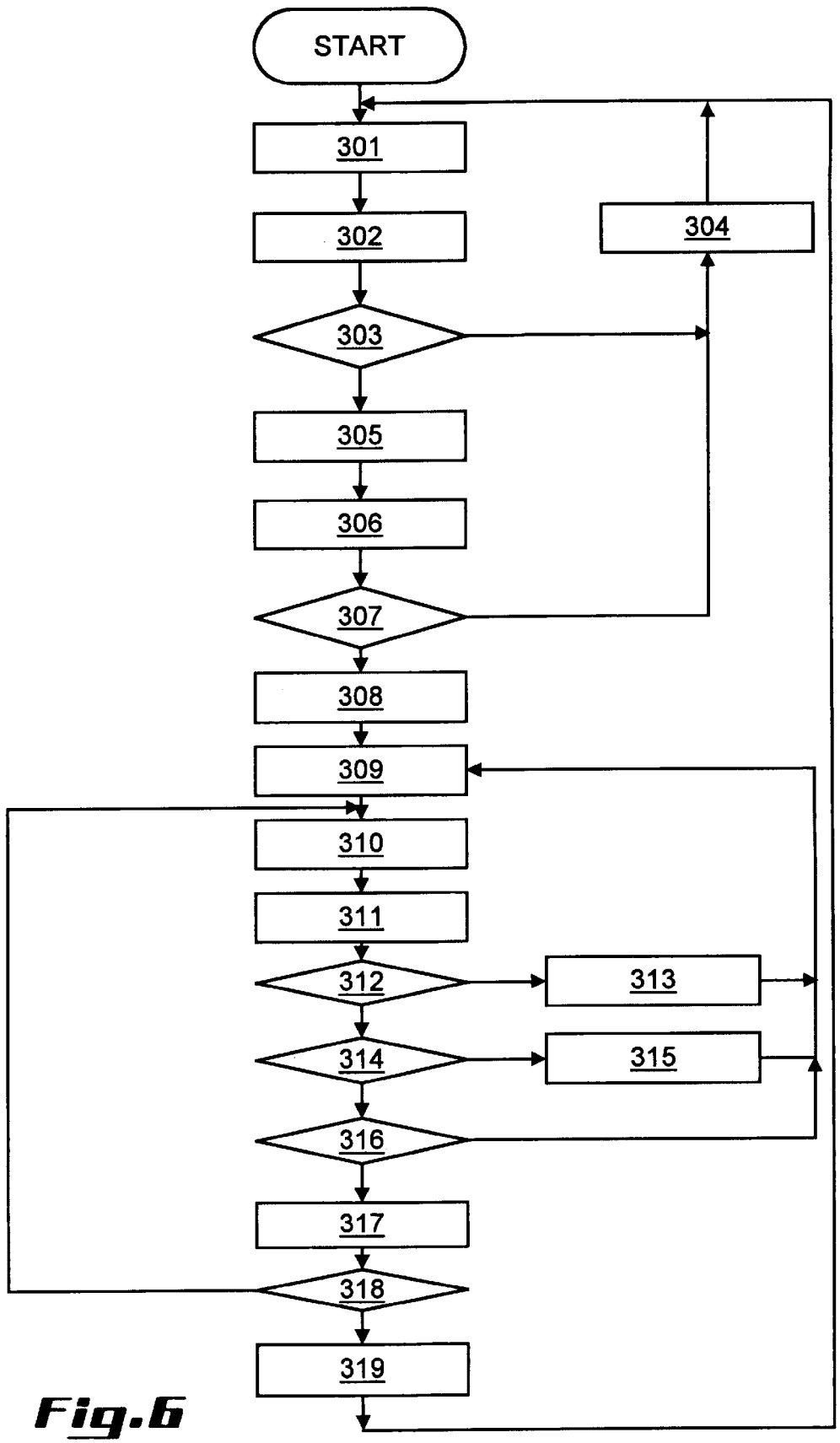
FIG. 6 shows a possible flow chart of functions which can be performed by the device according to FIG. 5.

According to the invention, preference is however given to a detection based on a comparison of the amplitude of successively received and amplified signals. This can be done for example according to the flowchart of FIG. 6, applied to a device for controlling the operation of a valve for a faucet.

In a first block 301 of this flowchart, a detection pulse is emitted. In the second block 302, the reception of detection pulses by the receiver is evaluated, resulting in a digital value as described hereabove. In decision block, it is then checked whether the received signal has the same amplitude as a quiescent value, or in other words whether the digital value of the received signal is the same as a quiescent value. This quiescent value is the average of the last n=4, 5, 6 or . . . values. By comparing each value with such an average quiescent value, the immunity for noise signals is enhanced for example with a factor of about 2 in case n is between 4 and 6.

In case, the value of the received signal is the same (303 Yes), a timer 304 is started which determines the frequency at which the detection pulses are emitted, for example 3 per second. In case, the measured value is different (303 No), a new detection signal is preferably immediately emitted in block 305 and evaluated again in block 306. If the value is different from the quiescent value for the second time, determined in decision block 307, then the valve is opened in block 308 or another system is actuated in case the device is used in another application. If the value is not different for the second time (307 No), the process is started again.

In order to detect the continuing presence of the object, after its arrival has been detected, a counter is set to six in block 309. Then a detection pulse is emitted and evaluated again in blocks 310 and 311 respectively. In decision block 312, the amplitude of the received signal is compared to the above described second threshold value. If it is higher than this second threshold value (312 Yes), the energy level of the emitted detection pulses is decreased in block 313 and a new detection pulse is immediately emitted in block 310, after the counter has been set again to six in block 309. If the value of the received and signal is not too large (312 No), there is checked, in decision block 314 whether it is smaller than the first threshold value, i.e. whether the received signal is not too weak. If yes, the energy level of the emitted detection pulses is increased in block 315 and a new detection pulse is also emitted immediately again, after the counter has been set again to six. When the amplitude of the received signal is between the first and second threshold value, and can thus be accurately measured, and it is stored in a memory.

In decision block 316, it is then checked whether the value of the newly received signal is different from the value of a previously received signal. If yes, the counter is set again to six in block 309 and a new pulse is emitted. If not (316 No), the counter is reduced by 1 in block 317 and there is checked, in decision block 318, whether the counter has reached zero. If not (318 No), a new detection pulse is emitted without resetting the counter to six. Time delay means are provided to determine the frequency of the emitted detection pulses and ensure that, when an user is present, the detection pulses are emitted for example at a frequency of three per second. If the counter has reached zero, i.e. after two seconds, the valve is closed in block 319 and the routine for detecting the arrival of a user is started again in block 301 by emitting a new detection pulse.

The above flowchart can now easily be adapted to the situation wherein the continuing presence of an object or user is determined on the basis of the actuations of the means for increasing or decreasing the energy level of the emitted detection pulses. In this case, the first and second threshold values are chosen much closer to one another, or are even equal to one another, depending on the desired sensitivity of the detection system. In this way, the counter will be reset to six even when very small variations occur. Consequently, in the flowchart of FIG. 6, block 316 is no longer necessary.

From the above description, it will be clear that the device according to the invention as described hereabove, can be modified in many ways, and can in particular be adapted to various applications, without leaving the scope of the appended claims.

What is claimed is:

1. A proximity detecting device for detecting the presence of an object in a target area and comprising an emitter, a circuitry for supplying electrical pulses of a predetermined energy level to said emitter for emitting detection pulses towards the target area, a receiver arranged for receiving said detection pulses and converting them into electrical signals, an amplifier for amplifying said electrical signals and for producing amplified electrical signals and a control circuitry for evaluating said amplified electrical signals to determine whether or not the object is present in the target area, said control circuit comprising means for determining on an ongoing basis the amplitude of said amplified electrical signals and means for increasing the energy level of said detection pulses when the amplitude of said amplified electrical signals is below a first threshold value and for decreasing the energy level of said detection pulses when the amplitude of said amplified electrical signals exceed a second threshold value, which second threshold value is greater or equal to the first threshold.

2. A device according to claim 1, wherein said emitter is a light emitting diode.

3. A device according to claim 1 wherein said circuitry for supplying the electrical pulses to said emitter comprises a first circuitry containing a primary coil and switching means for connecting the primary coil for a period of time to an electric voltage power source to accumulate an amount of magnetic energy in said primary coil, and a second circuitry containing said emitter and a secondary coil magnetically coupled to said primary coil to transform the accumulated magnetic energy by mutual induction upon opening said switching means each time into one of said electrical pulses, said means for increasing and decreasing the energy level of said detection pulses being adapted to increase and decrease, respectively, the period of time during which said primary coil is connected to said power source.

4. A device according to claim 1, wherein said amplifier provides a voltage gain which decreases as the amplitude of said amplified electrical signal increases and which voltage gain increases as the amplitude of said amplified electrical signal decreases.

5. A device according to claim 4, wherein said amplifier comprises an operational amplifier with a noninverting voltage feedback that varies in response to the amplitude of said amplified electrical signal.

6. A device according to claim 5, wherein said operational amplifier comprises a feedback loop including at least one resistor connected in parallel with a switching element that becomes conductive starting from a predetermined amplitude of said amplified electrical signals to provide the varying feedback.

7. A device according to claim 1, wherein said amplifier comprises means for reducing the amplitude of at least said amplified electrical signals having the greatest amplitude, the reduction being increased as the amplitude of said amplified electrical signal increases and the reduction being reduced as the amplitude of said amplified electrical signal decreases.

8. A device according to claim 7, wherein said amplitude reducing means comprises a power drain circuitry for draining a fraction of the energy of said amplified electrical signals, said power drain circuitry comprising at least one resistor connected in parallel with a switching element being conductive upon a predetermined amplitude of said amplified electrical signals to increase the reduction of the amplitude of said amplified electrical signals.

9. A device according to claim 1, wherein said control circuitry comprises means for comparing the amplitudes of successive ones of said amplified electrical signals and for determining, based on this comparison, whether or not the object is present in the target area.

10. A device according to claim 1, wherein said control circuitry comprises means for determining whether or not the object is present in the target area on the basis of the actuations of said means for increasing and decreasing the energy level of said detection pulses.

11. A device according to claim 1, wherein the target area is delimited by a surface positionally opposite said emitter for reflecting said detection pulses towards said receiver.

12. The device as set forth in claim 6 wherein said switching element is a diode.

13. The device as set forth in claim 8 wherein said switching element is a diode.

* * * * *